(12) United States Patent
Furuta et al.

(10) Patent No.: US 9,399,595 B2
(45) Date of Patent: Jul. 26, 2016

(54) MANUFACTURING METHOD FOR A GLASS FILM

(75) Inventors: Takaya Furuta, Otsu (JP); Koji Nishijima, Otsu (JP); Koichi Mori, Otsu (JP); Yasuhiro Matsumoto, Otsu (JP); Akio Nakabayashi, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 282 days.

(21) Appl. No.: 13/296,565

(22) Filed: Nov. 15, 2011

(65) Prior Publication Data

US 2012/0125967 A1    May 24, 2012

(30) Foreign Application Priority Data

Nov. 19, 2010   (JP) .................................. 2010-259034

(51) Int. Cl.
*B26F 3/02* (2006.01)
*B65H 35/10* (2006.01)
*B26F 3/00* (2006.01)
*C03B 33/023* (2006.01)
(Continued)

(52) U.S. Cl.
CPC ........... *C03B 33/0235* (2013.01); *C03B 33/033* (2013.01); *C03B 33/091* (2013.01); *Y02P 40/57* (2015.11); *Y10T 225/14* (2015.04)

(58) Field of Classification Search
CPC ...... G02B 1/04; C03B 33/033; C03B 33/091; C03B 33/102; C03B 33/105; C03B 33/0235; C03B 33/09; Y10T 225/14

USPC ........... 225/2–3; 65/90, 29.14, 105, 112, 273; 428/192, 337, 76, 189; 242/160.4, 520
See application file for complete search history.

(56) References Cited

U.S. PATENT DOCUMENTS 3,191,857 A * 6/1965 Galey et al. .................... 234/3
3,215,345 A * 11/1965 Ferguson ................... 225/93.5
(Continued)

FOREIGN PATENT DOCUMENTS

| CN | 1484619 | 3/2004 |
| CN | 1665748 | 9/2005 |

(Continued)

OTHER PUBLICATIONS

Supplementary European Search Report issued Nov. 6, 2013 in corresponding European Patent Application No. 11841791.4.
(Continued)

*Primary Examiner* — Ghassem Alie
*Assistant Examiner* — Bharat C Patel
(74) *Attorney, Agent, or Firm* — Wenderoth, Lind & Ponack, L.L.P.

(57) ABSTRACT

A manufacturing method for a glass film includes a cleaving step of dividing a glass film having a band shape into a product glass portion and an unnecessary glass portion, and a collecting step of sequentially shattering the unnecessary glass portion, and collecting the shattered unnecessary glass portion. The cleaving step is followed by vibration regulating processing of regulating vibrations of the unnecessary glass portion in a thickness direction thereof, the vibration regulating processing being executed in at least one location in the longitudinal direction of the unnecessary glass portion, and the collecting step being executed on a downstream side of the at least one location of the vibration regulating processing.

9 Claims, 5 Drawing Sheets

(51) Int. Cl.
*C03B 33/033* (2006.01)
*C03B 33/09* (2006.01)

(56) References Cited

U.S. PATENT DOCUMENTS

| | | | | |
|---|---|---|---|---|
| 3,729,302 | A * | 4/1973 | Heaton | 65/105 |
| 4,049,167 | A * | 9/1977 | Guissard | C03B 33/027 |
| | | | | 225/103 |
| 4,285,451 | A * | 8/1981 | Ferraino | 225/2 |
| 4,454,972 | A * | 6/1984 | Maltby et al. | 225/96.5 |
| 4,612,030 | A * | 9/1986 | Smids | 65/91 |
| 5,413,263 | A * | 5/1995 | Bando | 225/96.5 |
| 5,871,134 | A * | 2/1999 | Komagata et al. | 225/2 |
| 6,101,845 | A * | 8/2000 | Kojima et al. | 65/101 |
| 6,113,225 | A * | 9/2000 | Miyata et al. | 347/70 |
| 6,412,677 | B1 * | 7/2002 | Yoshikuni et al. | 225/2 |
| 6,502,423 | B1 * | 1/2003 | Ostendarp et al. | 65/29.14 |
| 6,588,477 | B2 * | 7/2003 | Habeck et al. | 156/510 |
| 6,592,703 | B1 * | 7/2003 | Habeck et al. | 156/257 |
| 6,758,064 | B1 * | 7/2004 | Kariya | 65/91 |
| 8,292,141 | B2 * | 10/2012 | Cox et al. | 225/2 |
| 8,720,227 | B2 * | 5/2014 | Tsuji et al. | 65/91 |
| 9,027,815 | B2 * | 5/2015 | Kudva | B26F 3/002 |
| | | | | 225/2 |
| 2004/0060416 | A1 * | 4/2004 | Luiz | 83/862 |
| 2006/0081101 | A1 * | 4/2006 | Hayashi et al. | 83/15 |
| 2007/0275338 | A1 * | 11/2007 | Acker et al. | 432/8 |
| 2010/0107848 | A1 * | 5/2010 | Joseph et al. | 83/862 |
| 2010/0192634 | A1 * | 8/2010 | Higuchi et al. | 65/60.1 |
| 2010/0195074 | A1 * | 8/2010 | Sogard | 355/67 |
| 2011/0126593 | A1 * | 6/2011 | Abdul-Rahman et al. | 65/97 |
| 2011/0177325 | A1 | 7/2011 | Tomamoto et al. | |

FOREIGN PATENT DOCUMENTS

| | | |
|---|---|---|
| FR | 2 858 815 | 2/2005 |
| JP | 2000-335928 | 12/2000 |
| JP | 2006-321695 | 11/2006 |
| JP | 2007-045642 | 2/2007 |
| JP | 2011-144093 | 7/2011 |
| TW | 201022163 | 6/2010 |
| WO | 2005/021452 | 3/2005 |

OTHER PUBLICATIONS

International Search Report issued Feb. 21, 2012 in corresponding International (PCT) Application No. PCT/JP2011/076088.
International Preliminary Report on Patentability and Written Opinion of the International Searching Authority mailed Jun. 20, 2013 in International (PCT) Application No. PCT/JP2011/076088.
Chinese Office Action issued Sep. 29, 2014 in corresponding Chinese Patent Application No. 201180044038.3 (with partial English translation).
Taiwanese Office Action issued Apr. 27, 2015 in corresponding Taiwanese Patent Application No. 100141953 with partial English translation.

* cited by examiner

MANUFACTURING METHOD FOR A GLASS FILM

BACKGROUND OF THE INVENTION

1. Field of the Invention

The present invention relates to an improvement of a manufacturing method for a glass film.

2. Description of Related Art

As is well known, flat panel displays (FPDs) have become mainstream as image display devices in recent years, the FPDs being typified by a liquid crystal display (LCD), a plasma display (PDP), an OLED display (OLED), and the like. Progress is being made toward further reducing the weight of those FPDs, and hence there is promoted further thinning of glass sheets used as a main component for the FPDs.

Further, for example, there is a growing use of an organic light-emitting diode not only for applications to a display that uses TFTs to blink light of three primary colors, but also as a plane light source, such as a backlight of the LCD and a light source for interior illumination, which emits only monochrome light. An illumination device that uses the organic light-emitting diode as a light source may have a freely deformable light-emitting surface as long as the organic light-emitting diode is constructed of a flexible glass sheet. Therefore, from the viewpoint of ensuring sufficient flexibility, there is also promoted further thinning of the glass sheet to be used for this type of illumination device.

As a method of cleaving the above-mentioned glass sheet to be used for the FPD, illumination device, and the like into a predetermined size, the following method is generally employed. That is, a scribe having a predetermined depth is engraved in the front surface or the back surface of the glass sheet along a preset cleaving line, and then a bending stress is applied to the scribe to cleave the glass sheet. However, in a case where the glass sheet is thinned into a state of a glass film, the scribe engraving itself is extremely difficult, and further, there may arise such a problem that the strength of the glass sheet significantly decreases due to a small defect such as a lateral crack formed in the cleaved surface. In particular, a long (band-like) glass film formed from molten glass by various manufacturing methods is required to be successively cleaved along the preset cleaving line extending in a delivery direction (longitudinal direction) of the glass film while being delivered in the longitudinal direction. However, the successive bending stress is not easily applied with high accuracy to the band-like glass film that is being delivered in the longitudinal direction thereof.

Therefore, when the band-like glass film is successively cleaved along the preset cleaving line extending in the longitudinal direction thereof, a cleaving method using a thermal stress has been employed in place of the cleaving method using the bending stress. Specifically, in this method, as described in Patent Literature 1 below, the band-like glass film is locally heated along the preset cleaving line extending in the longitudinal direction thereof while being delivered in the longitudinal direction, and then the locally heated portion (region) is cooled. As a result, a thermal stress is generated, to thereby successively cleave the glass film (in the longitudinal direction thereof).

In a case where the above-mentioned successive cleaving is performed in order to divide the band-like glass film into a portion to be finished into a predetermined glass product (hereinafter, referred to as "product glass portion") and an unnecessary portion which cannot serve as a glass product (hereinafter, referred to as "unnecessary glass portion"), the product glass portion thus divided is continuously delivered to the downstream side and finished into a glass roll, a glass sheet having a predetermined dimension, or the like. On the other hand, the unnecessary glass portion thus divided is continuously delivered to the downstream side and sequentially broken into short glass sheets to be collected. Note that, the collected short glass sheets may be discarded directly, but are generally reused as a material for forming a glass film or the like.

CITATION LIST

Patent Literature

Patent Literature 1: JP 2000-335928 A

SUMMARY OF THE INVENTION

By the way, in the manufacturing method as described in Patent Literature 1 above, except for the early stage of forming the glass film, the above-mentioned successive cleaving of the glass film and collecting step in which the unnecessary glass portion is broken and collected are basically progressed at the same time. Further, during the period in which the unnecessary glass portion is being broken, there may occur, in many cases, such vibrations that the continuously delivered unnecessary glass portion vibrates mainly in a thickness direction thereof. Therefore, when the above-mentioned respective steps are performed at the same time without taking any measure, the vibrations occurring along with the breaking of the unnecessary glass portion are transmitted to part of the glass film that is being cleaved. As a result, the cleaving accuracy of the glass film and, by extension, the quality of the product glass portion (glass product) may be affected adversely. It is considered that such a problem may be solved by, for example, installing a collecting device for breaking the unnecessary glass portion and collecting the broken unnecessary glass portion in a position separated so that the vibrations occurring along with the breaking of the unnecessary glass portion are not transmitted to the part of the glass film that is being cleaved, or not easily transmitted thereto. However, there arises such a new problem that a manufacturing line is unnecessarily upsized.

In view of the above, the present invention has an object to provide a manufacturing method for a glass film, which is capable of obtaining a high-quality product glass portion from a band-like glass film without unnecessarily upsizing a manufacturing line therefor.

Solution to Problem

In order to achieve the above-mentioned object, the present invention provides a manufacturing method for a glass film, including, in this order: a cleaving step of dividing a glass film having a band shape into a product glass portion and an unnecessary glass portion by successively cleaving, while delivering the glass film in a longitudinal direction thereof, the glass film along a preset cleaving line extending in the longitudinal direction using a thermal stress that is generated along with localized heating performed along the preset cleaving line and cooling performed after the localized heating; and a collecting step of sequentially breaking or shattering the unnecessary glass portion, which is continuously delivered in the longitudinal direction, and collecting the broken or shattered unnecessary glass portion, in which the cleaving step is followed by vibration regulating processing of regulating vibrations of the unnecessary glass portion in a thickness direction thereof, the vibration regulating processing being executed in at least one location in the longitudinal direction of the unnecessary glass portion together with the collecting step executed on a downstream side of the at least one location of the vibration regulating processing. Note that, the "breaking of the unnecessary glass portion" is intended to be breaking of a long, band-like unnecessary glass portion into short glass sheets having a dimension in the longitudinal (delivery) direction that is about several tens of millimeters to several hundreds of millimeters. Further, the "shattering of the unnecessary glass portion" is intended to be shattering of the above-mentioned unnecessary glass portion into minute glass pieces.

As described above, in the manufacturing method for a glass film according to the present invention, the vibration regulating processing of regulating vibrations of the unnecessary glass portion in the thickness direction thereof is performed, and meanwhile, the above-mentioned collecting step is executed on the downstream side of the vibration regulating processing location. Thus, the vibrations occurring along with the breaking or shattering of the unnecessary glass portion are not easily transmitted to the cleaved portion of the glass film (portion of the glass film that is being cleaved by the thermal stress), with the result that the cleaving accuracy of the glass film and, by extension, the quality of the product glass portion can be improved. Besides, such an effect is obtained by executing, after the cleaving step is executed, the regulation of the vibrations of the unnecessary glass portion in the thickness direction thereof in at least one location in the longitudinal direction of the continuously delivered unnecessary glass portion. Thus, it is possible to avoid unnecessarily upsizing the manufacturing line for a glass film.

In the above-mentioned structure, the vibration regulating processing may be executed so that the vibrations of the unnecessary glass portion in the thickness direction thereof are regulated in a plurality of separate locations in the longitudinal direction of the unnecessary glass portion.

In this manner, the effect of controlling the vibrations of the unnecessary glass portion in the thickness direction thereof can be enhanced as compared to the case where the vibrations are regulated in only one location in the longitudinal direction of the unnecessary glass portion. Thus, it is expected that the cleaving accuracy of the glass film can further be enhanced, that is, a higher-quality product glass portion can be obtained.

In the above-mentioned structure, there may be further provided, after the cleaving step, a separating step of separating the product glass portion and the unnecessary glass portion from each other by changing a delivery direction of at least one of the product glass portion and the unnecessary glass portion. In this case, the cleaving step is followed by the vibration regulating processing together with the separating step executed on a downstream side of the at least one location of the vibration regulating processing.

When the above-mentioned separating step is provided, it is possible to prevent, to the extent possible, the adjacent cleaved surfaces of the product glass portion and the unnecessary glass portion from interfering with each other, which may result in a small defect occurring in the cleaved surface of the product glass portion. When the separating step having such an effect is executed while performing the vibration regulating processing after executing the cleaving step, and executed on the downstream side of the vibration regulating processing location, the effect of absorbing the vibrations occurring along with the breaking and shattering of the unnecessary glass portion can be enhanced as compared to the case of executing the separating step on the upstream side of the vibration regulating processing location. Therefore, such a configuration is advantageous in obtaining a high-quality product glass portion.

In the above-mentioned structure, the vibration regulating processing may be executed by nipping the unnecessary glass portion using a first member and a second member to be brought into contact with a front surface and a back surface of the unnecessary glass portion, respectively.

With this structure, the vibration regulating processing for the vibrations of the unnecessary glass portion in the thickness direction thereof can be executed by taking a simple measure and, by extension, the cleaving accuracy of the glass film can be improved.

As the above-mentioned first member, for example, there may be used a draggably rotatable roller member, in other words, a roller member rotatable when being brought into contact with the front surface of the unnecessary glass portion (delivered in the longitudinal direction thereof), or a member movable in synchronization with the unnecessary glass portion under a state in which the member is held in contact with the front surface of the unnecessary glass portion. On the other hand, as the above-mentioned second member, there may be used a conveyor for delivering the unnecessary glass portion in the longitudinal direction thereof, irrespective of whether the first member is constructed of any one of the members described above or constructed of other means.

Further, in the above-mentioned structure, the collecting step may be processing of shattering the unnecessary glass portion into glass pieces and collecting the glass pieces. Specifically, the processing may be configured to shatter the unnecessary glass portion into the glass pieces in a manner that the unnecessary glass portion is introduced into a shattering passage through an introduction port situated on one end side of the shattering passage and is vibrated by an airflow formed inside the shattering passage to collide against an inner wall of the shattering passage.

In the case where the collecting step is configured to execute the processing of shattering the unnecessary glass portion into glass pieces and collecting the glass pieces as described above, a mechanically movable mechanism may be used for shattering the unnecessary glass portion into glass pieces. However, there is such a problem that the mechanically movable mechanism is large and complicated, and is easy to fail. In contrast, with the above-mentioned structure, the unnecessary glass portion introduced into the shattering passage is forced to vibrate by the airflow formed inside the shattering passage, to thereby collide against the inner wall of the shattering passage. In this manner, the unnecessary glass portion is shattered into glass pieces. Thus, there is no need to arrange the mechanically movable mechanism inside the shattering passage for shattering the unnecessary glass portion, and accordingly, it is possible to simplify the manufacturing line and reduce the frequency of failure to improve the line operating rate. Further, the vibrations imparted by the airflow and the vibrations caused by the collision against the inner wall of the shattering passage are not easily transmitted to the cleaved portion of the glass film by executing the vibration regulating processing (due to presence of vibration regulating means), and accordingly, the cleaving accuracy of the glass film can be improved.

The above-mentioned manufacturing method for a glass film according to the present invention is suitably applicable to a case of manufacturing a glass film having a longitudinal dimension exceeding 4 m. This is because the bending stress is not easily applied with high accuracy when successively cleaving the long glass film in the longitudinal direction thereof, and hence the method utilizing a thermal stress is employed in actuality. Further, the manufacturing method for a glass film according to the present invention is particularly suitably applicable to a case of manufacturing a glass film having a thickness of 200 μm or less.

Advantageous Effects of the Invention

As described above, according to the present invention, it is possible to obtain a high-quality product glass portion from a band-like glass film without unnecessarily upsizing a manufacturing line therefor.

DETAILED DESCRIPTION OF THE INVENTION

Hereinafter, an embodiment of the present invention is described with reference to the drawings.

Figure 1:
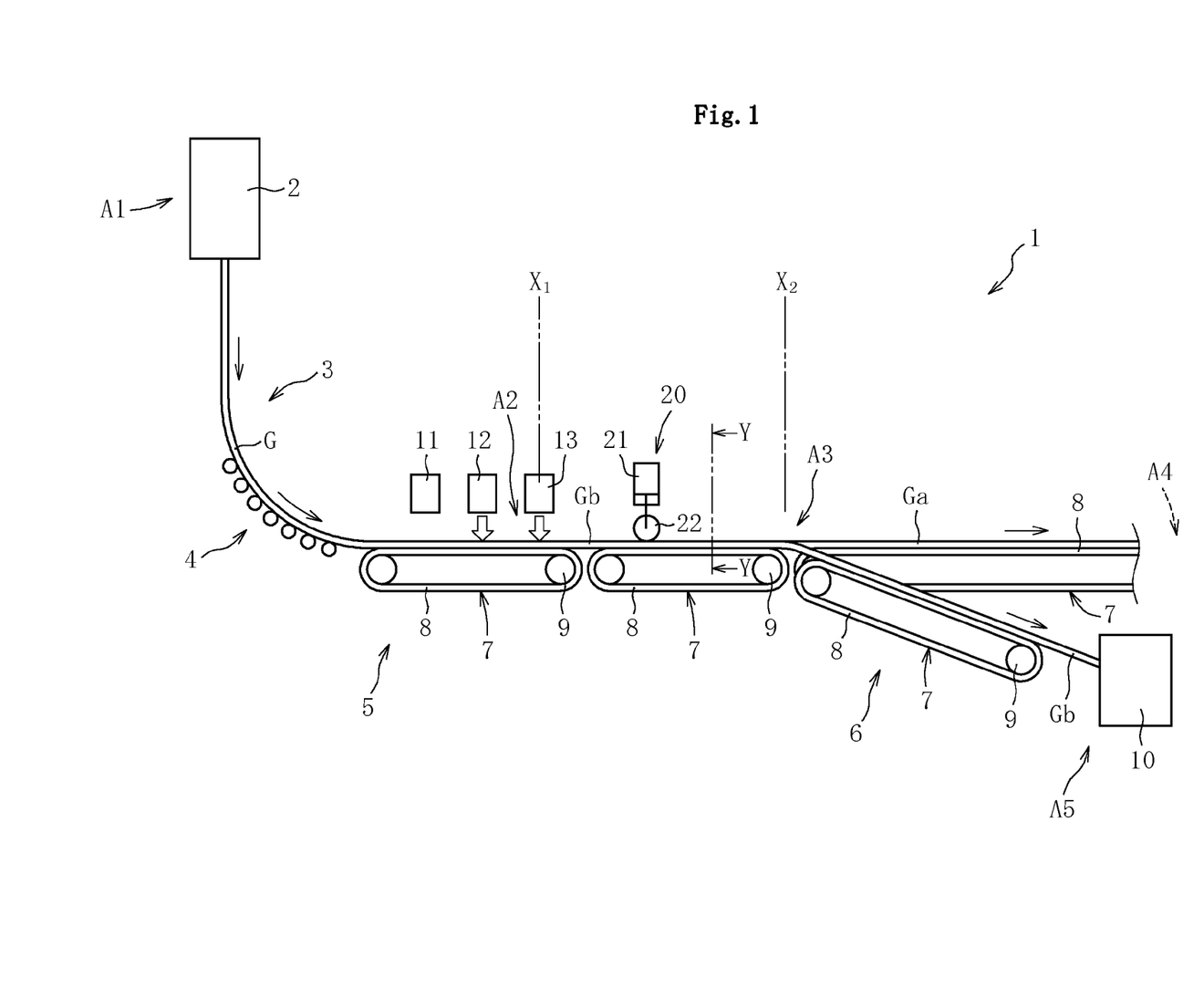
FIG. 1 A schematic side view illustrating an example of a manufacturing line to be used for implementing a manufacturing method for a glass film according to the present invention.

FIG. 1 is a schematic side view illustrating an example of a manufacturing line (manufacturing apparatus) 1 to be used for implementing a manufacturing method for a glass film according to the present invention. The manufacturing line 1 mainly includes, in combination, a forming area A1, a cleaving area A2, a separating area A3, a finishing area A4, and a collecting area A5 which are described below in detail.

The forming area A1 is a forming step area for forming a long (band-like) glass film G having a longitudinal dimension exceeding 4 m, and a forming device 2 is provided in the forming area A1. As the forming device 2, there is herein used a forming device for forming the glass film G by a so-called overflow downdraw method, in which molten glass is successively drawn downward vertically. In the overflow downdraw method, the forming of the glass film G proceeds under a state in which the surface thereof is only held in contact with outside air (atmospheric gas in the forming device 2), and hence there is an advantage that high flatness can be ensured for the surface of the glass film G. Therefore, in a case where the glass film G is used as, for example, a glass substrate for an FPD, it becomes easy to form fine elements and wiring on the surface thereof with high precision.

Note that, in the drawings including FIG. 1 which illustrate the embodiment of the present invention, the thickness of the glass film G is exaggerated, and the actual thickness of the glass film G is 300 μm or less. In other words, the manufacturing method for a glass film according to the present invention is employed particularly suitably for manufacturing a glass film G having a thickness of 300 μm or less, preferably 200 μm or less, more preferably 100 μm or less.

The band-like glass film G formed in the forming device 2 and delivered from the forming device 2 is transferred to a conveyance device 3 for conveying the glass film G in a longitudinal direction thereof. At the end of the upstream portion of the conveyance device 3, a curved conveyance section 4 curved into an arc shape is provided, and the glass film G delivered from the forming device 2 is delivered along the curved conveyance section 4 to the downstream side, with the result that a traveling direction of the glass film G is converted from a vertical direction to a horizontal direction. A horizontal conveyance section 5 that constructs the conveyance device 3 together with the curved conveyance section 4 (further, with an inclined conveyance section 6 described later) is connected at its upstream end to a downstream end of the curved conveyance section 4, and the glass film G delivered along the horizontal conveyance section 5 to the downstream side is first introduced into the cleaving area A2.

Note that, the horizontal conveyance section 5 that constructs the conveyance device 3 includes a plurality of linearly arranged conveyors 7 each including an endless belt member 8 and drive means 9 for driving the belt member 8. The drive speed of the belt member 8 (conveyor 7) may be set as appropriate depending on the forming speed of the glass film G (delivery speed of the glass film G from the forming device 2), but is basically set substantially equal to the forming speed because a speed difference therebetween may cause trouble with the conveyance of the glass film G to the downstream side, which is supposed to be performed smoothly.

The cleaving area A2 is an area in which a cleaving step is executed. In the cleaving step, the glass film G successively delivered in the longitudinal direction thereof along the horizontal conveyance section 5 is successively cleaved along a preset cleaving line (not shown) extending in the delivery direction (longitudinal direction), to thereby divide the glass film G into a product glass portion Ga and an unnecessary glass portion Gb. Specifically, in the method of successively forming the glass film G from molten glass as in the above-mentioned overflow downdraw method, in a widthwise central region of the glass film G, the accuracy of the dimension or the like is ensured to the extent that the widthwise central region is available as a glass product, but in a widthwise end region of the glass film G, the accuracy of the dimension or the like is not ensured to the extent that the widthwise end region is available as a glass product, in many cases. Therefore, the glass film G is divided into the product glass portion Ga and the unnecessary glass portion Gb by providing the above-mentioned cleaving area A2 in which the cleaving step is executed.

The above-mentioned cleaving area A2 in which the cleaving step is executed is provided between localized heating means 12 and cooling means 13, which are disposed along the horizontal conveyance section 5 in the stated order. The localized heating means 12 is arranged for locally heating (the region of presence of) the preset cleaving line extending in the longitudinal direction of the glass film G, and for example, there is used a laser irradiation device capable of irradiation of a laser such as a carbon dioxide laser. The cooling means 13 is arranged for cooling the portion of the glass film G which is locally heated by the localized heating means 12, and for example, there is used a device capable of jetting, onto the glass film G, a coolant such as a cooling liquid, a cooling gas, or a mixture of the cooling liquid and the cooling gas. Note that, on the upstream side of the localized heating means 12, crack forming means 11 such as a diamond cutter or a laser irradiation device is provided.

In the above-mentioned structure, when a longitudinal end portion of the glass film G delivered along the horizontal conveyance section 5 to the downstream side reaches a region opposed to the crack forming means 11, an initial crack serving as a cleaving start point is formed by the crack forming means 11 in a predetermined widthwise position of the longitudinal end portion of the glass film G. When the glass film G having the initial crack formed therein is further delivered along the horizontal conveyance section 5 to the downstream side so that the longitudinal end portion of the glass film G reaches a region opposed to the localized heating means 12, the localized heating means 12 starts to irradiate (the initial crack of) the glass film G with a laser. Subsequently, the glass film G is further delivered to the downstream side while being kept irradiated with the laser. Accordingly, a predetermined widthwise portion of the glass film G is locally heated along the delivery direction successively. When the locally heated portion of the glass film G passes through a region opposed to the cooling means 13, the locally heated portion of the glass film G is cooled by the jet of the coolant from the cooling means 13, and by a thermal stress generated along therewith, the initial crack is propagated to a rear side in the delivery direction along with the delivery of the glass film G. As described above, the band-like glass film G is successively cleaved along the preset cleaving line extending in the longitudinal direction thereof, and is thus divided into the product glass portion Ga and the unnecessary glass portion Gb. Both the product glass portion Ga and the unnecessary glass portion Gb are continuously delivered along the horizontal conveyance section 5 to the downstream side.

On the downstream side of the above-mentioned cleaving area A2, the separating area A3 is provided. In the separating area A3, there is executed a separating step of separating the product glass portion Ga and the unnecessary glass portion Gb from each other by changing the delivery direction of at least one of the product glass portion Ga and the unnecessary glass portion Gb. In this embodiment, the delivery direction of the product glass portion Ga remains as the horizontal direction, whereas the delivery direction of the unnecessary glass portion Gb is changed from the horizontal direction to an inclined direction, which is inclined at a predetermined angle from the horizontal direction. Subsequently, the unnecessary glass portion Gb is delivered to the downstream side along the inclined conveyance section 6 extending so as to be branched from the horizontal conveyance section 5. As a matter of course, unlike this embodiment, the delivery direction of the unnecessary glass portion Gb may remain as the horizontal direction, whereas the delivery direction of the product glass portion Ga may be changed, and alternatively, the delivery directions of both the product glass portion Ga and the unnecessary glass portion Gb may be changed. Note that, the inclined conveyance section 6 includes a conveyor 7 having a similar structure as those of the horizontal conveyance section 5.

A separation start point $X_2$ of the product glass portion Ga and the unnecessary glass portion Gb is provided in a position shifted by a predetermined amount from a cleaving completion point (installation position of the cooling means 13) $X_1$ of the glass film G to the downstream side. This is because, when the separation start point $X_2$ of both the glass portions Ga and Gb and the cleaving completion point $X_1$ of the glass film G are set extremely close to each other so that the separation of both the glass portions Ga and Gb is started immediately after the division of the product glass portion Ga and the unnecessary glass portion Gb is completed, the initial crack may be propagated in a direction different from the predetermined direction, and the cleaving accuracy of the glass film G and, by extension, the quality of the product glass portion Ga may be affected adversely. For this reason, apart from the variation that depends on the thickness of the glass film G or the like, the separation start point $X_2$ of the product glass portion Ga and the unnecessary glass portion Gb is, for example, provided in a position shifted by about 700 mm from the cleaving completion point $X_1$ of the glass film G to the downstream side.

Note that, the above-mentioned separating step (separating area A3) is not necessarily provided, but when the separating step (separating area A3) is provided, it is possible to prevent, to the extent possible, adjacent cleaved surfaces of the product glass portion Ga and the unnecessary glass portion Gb from interfering with each other, which may result in a small defect occurring in the cleaved surface of the product glass portion Ga. Therefore, such a configuration is advantageous in obtaining a high-quality product glass portion Ga (glass product).

In the finishing area A4, there is executed a finishing step of finishing the product glass portion Ga, which is separated from the unnecessary glass portion Gb and continuously delivered in the longitudinal direction, into a predetermined glass product. Although a detailed illustration is omitted, in the finishing area A4, for example, there is provided a roll-up device for rolling, into a roll shape, the band-like product glass portion Ga continuously delivered in the longitudinal direction thereof to obtain a so-called glass roll, or a cutting device for sequentially cutting the band-like product glass portion Ga to obtain glass sheets having a predetermined dimension. Note that, the above-mentioned glass product obtained in the finishing area A4 is delivered to a customer or to the subsequent step.

The collecting area A5 is an area in which a collecting step is executed. In the collecting step, the unnecessary glass portion Gb, which is separated from the product glass portion Ga and continuously delivered in the longitudinal direction, is sequentially broken or shattered to be collected. In this area, at a downstream end of the inclined conveyance section 6, there is provided a collecting device 10 for shattering the band-like unnecessary glass portion Gb into minute glass pieces and collecting the glass pieces. Note that, the glass pieces collected by the collecting device 10 are reused or discarded.

Although a detailed illustration is omitted, the collecting device 10 includes, for example, a shattering passage that forms a space for shattering the unnecessary glass portion Gb, suction means for causing the unnecessary glass portion Gb delivered along the inclined conveyance section 6 to enter the shattering passage and sucking glass pieces generated by shattering the entered unnecessary glass portion Gb, and a collecting box for collecting the sucked glass pieces. The collecting device 10 executes shattering processing in the following manner. First, when the suction means is activated and the atmospheric pressure inside the shattering passage becomes a negative pressure, there is formed an airflow flowing inside the shattering passage from an introduction port (opening portion on the upstream side) toward a delivery port (opening portion on the downstream side) of the shattering passage. As a result, the unnecessary glass portion Gb introduced into the shattering passage is affected by the above-mentioned airflow on the shattering passage to vibrate in a thickness direction of the unnecessary glass portion Gb, and collides against an inner wall of the shattering passage.

Through the repetitive collisions, the band-like unnecessary glass portion Gb is shattered into minute glass pieces, and the glass pieces are delivered through the delivery port of the shattering passage and collected by the collecting box.

Figure 2:
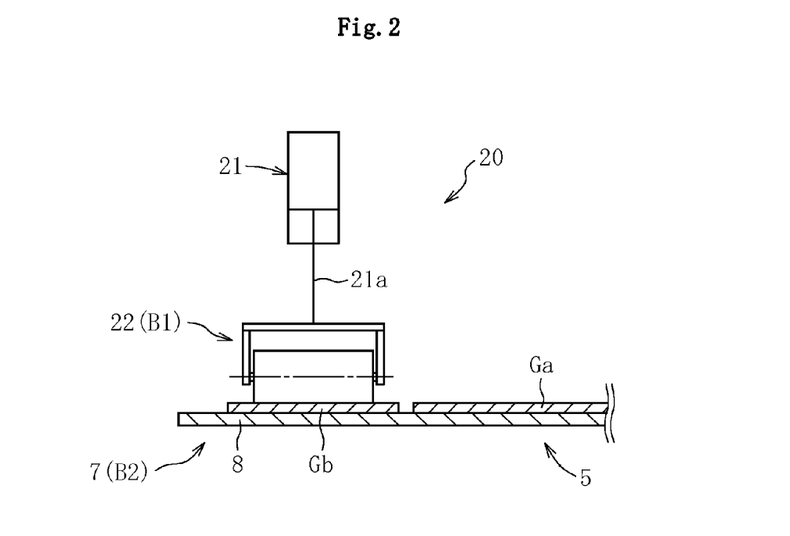
FIG. 2 A sectional view taken along the line Y-Y of FIG. 1.

In the manufacturing method for a glass film according to the present invention, after the cleaving step is executed, vibration regulating processing of regulating vibrations of the unnecessary glass portion Gb in the thickness direction thereof is performed in at least one location in the longitudinal direction of the unnecessary glass portion Gb, and meanwhile, the above-mentioned collecting step is executed on the downstream side of the vibration regulating processing location. In this embodiment, in order to execute the vibration regulating processing of regulating vibrations of the unnecessary glass portion Gb in the thickness direction thereof after the cleaving step is executed and before the separating step is executed, there is provided vibration regulating means 20 for executing vibration regulating processing on the downstream side of the cleaving area A2 and on the upstream side of the separating area A3. As illustrated in FIG. 2 as an enlarged view, the vibration regulating means 20 includes a first member B1 and a second member B2 for nipping the unnecessary glass portion Gb in the thickness direction thereof. The first member B1 and the second member B2 are to be brought into contact with the front surface and the back surface of the unnecessary glass portion Gb, respectively, and a roller member 22 and the above-mentioned conveyor 7 herein serve as the first member B1 and the second member B2, respectively.

The roller member 22 serving as the first member B1 is rotatably mounted onto a lower end of a cylinder 21 (cylinder rod 21a) that is telescopically movable in a direction (vertical direction) orthogonal to the delivery direction of the unnecessary glass portion Gb. A drive source for rotationally driving the roller member 22 is not provided, and hence the roller member 22 rotates (draggably rotates) when being brought into contact with the front surface of the unnecessary glass portion Gb that is delivered in the longitudinal direction thereof. In the vibration regulating means 20 of this embodiment, an extension/retraction amount (amount of extension from a retraction limit position) of the cylinder rod 21a of the cylinder 21 is adjusted so that a nipping force for the unnecessary glass portion Gb (vibration regulating force for the unnecessary glass portion Gb) is adjustable.

The above-mentioned structure is employed for the following reason. That is, in the manufacturing line 1 for a glass film having the structure described above, except for the early stage of forming the glass film G, the cleaving step in which successive cleaving of the glass film G is executed and the collecting step in which the unnecessary glass portion Gb is shattered and collected are progressed at the same time. During the period in which the unnecessary glass portion Gb is being sequentially shattered, as described above, there occur such vibrations that the unnecessary glass portion Gb continuously delivered in the longitudinal direction thereof vibrates in the thickness direction thereof. When the above-mentioned respective steps are executed at the same time without taking any measure, the vibrations occurring along with the shattering of the unnecessary glass portion Gb are transmitted to part of the glass film G that is present in the cleaving area A2 (part of the glass film G that is being cleaved). As a result, the cleaving accuracy of the glass film G and, by extension, the quality of the product glass portion Ga are affected adversely. When the part of glass film G that is being cleaved vibrates in the thickness direction thereof, in the case where the crack is propagated along the preset cleaving line by cooling performed by the cooling means 13, the crack is not easily propagated along the preset cleaving line.

In contrast, as in the present invention, when the vibration regulating processing of regulating vibrations of the unnecessary glass portion Gb in the thickness direction thereof is performed, and meanwhile, the unnecessary glass portion Gb is sequentially shattered (collected) on the downstream side of the vibration regulating processing location, the vibrations occurring along with the shattering of the unnecessary glass portion Gb are not easily transmitted to the part of the glass film G that is present in the cleaving area A2, with the result that the cleaving accuracy of the glass film G and, by extension, the quality of the product glass portion Ga are improved. In addition, such an effect is obtained by regulating, after the cleaving step is executed, the vibrations of the unnecessary glass portion Gb in the thickness direction thereof in one location in the longitudinal direction of the unnecessary glass portion Gb, which is continuously delivered in the longitudinal direction. Thus, it is possible to avoid unnecessarily upsizing the manufacturing line 1 for a glass film.

In particular, in this embodiment, the above-mentioned vibration regulating processing is performed between the cleaving area A2 and the separating area A3, and hence the effect of absorbing the vibrations can be enhanced as compared to the case of performing the vibration regulating processing on the downstream side of the separating area A3. Therefore, such a configuration is advantageous in obtaining a high-quality product glass portion Ga.

Further, the vibration regulating processing is performed by nipping the unnecessary glass portion Gb using the first member B1 and the second member B2 to be brought into contact with the front surface and the back surface of the unnecessary glass portion Gb, respectively. In addition, particularly as the second member B2, the conveyor 7 for continuously delivering the unnecessary glass portion Gb to the downstream side is used. Thus, the occurrence of the vibrations of the unnecessary glass portion Gb in the thickness direction thereof can be regulated by taking a simple measure.

Hereinabove, the embodiment of the present invention has been described, but the vibration regulating means 20 that may be employed for performing the vibration regulating processing is not limited to the vibration regulating means described above.

Figure 3:
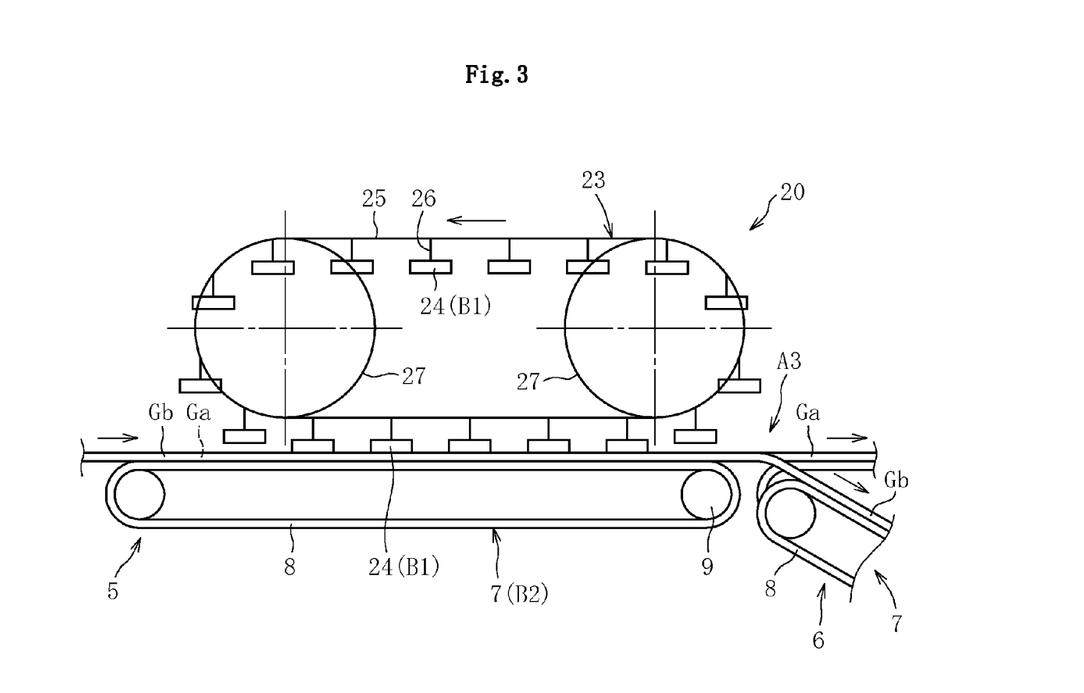
FIG. 3 A schematic side view illustrating another example of vibration regulating means.

FIG. 3 is an enlarged view illustrating another example of the vibration regulating means 20. The vibration regulating means 20 of FIG. 3 is different in structure from the vibration regulating means 20 described above mainly in that: (1) after the cleaving step is executed, the vibrations of the unnecessary glass portion Gb in the thickness direction thereof can be regulated in a plurality of separate locations in the longitudinal direction of the unnecessary glass portion Gb, which is continuously delivered to the downstream side; and (2) as the first member B1 for nipping the unnecessary glass portion Gb in cooperation with the conveyor 7 serving as the second member B2, there is used a member movable in synchronization with the unnecessary glass portion Gb under a state in which the member is held in contact with the front surface of the unnecessary glass portion Gb. When the structure of the above-mentioned item (1) is employed, there is an advantage that the vibrations of the unnecessary glass portion Gb in the thickness direction thereof can be regulated more effectively as compared to the case where the vibrations are regulated in only one location in the longitudinal direction of the unnecessary glass portion Gb.

In this embodiment, the first member B1 includes a weight 24 to be placed, after the cleaving step is executed, on the front surface of the unnecessary glass portion Gb that is continuously delivered in the longitudinal direction thereof, and in this case, a plurality of weights 24 are provided. The plurality of weights 24 are supported by weight support/ synchronous movement means 23 for supporting the weights 24 so as to be movable in synchronization with the unnecessary glass portion Gb that is delivered along the horizontal conveyance section 5 (conveyor 7) to the downstream side. A main part of the weight support/synchronous movement means 23 is constructed of rotators 27 and 27 disposed in two separate locations in the longitudinal direction of the unnecessary glass portion Gb, at least one of the rotators 27 and 27 being rotationally driven by a drive source (not shown) at the same speed as the delivery speed of the unnecessary glass portion Gb, an endless weight conveying member 25 looped around both the rotators 27 and 27, and a plurality of weight supporting members 26, which are fixed at one end to the weight conveying member 25 and support the respective weights 24 at the other end in a suspended manner. Note that, in the vibration regulating means 20 of this embodiment, a weight of each weight 24 serving as the first member B1 is adjusted so that a nipping force for the unnecessary glass portion Gb (vibration regulating force for the unnecessary glass portion Gb) is adjustable.

Figure 4A:
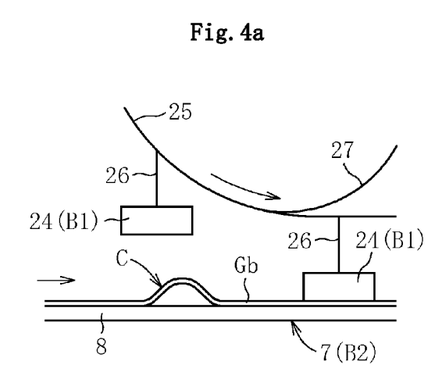
FIG. 4a An enlarged view of a main part of the vibration regulating means illustrated in FIG. 3.
Figure 4B:
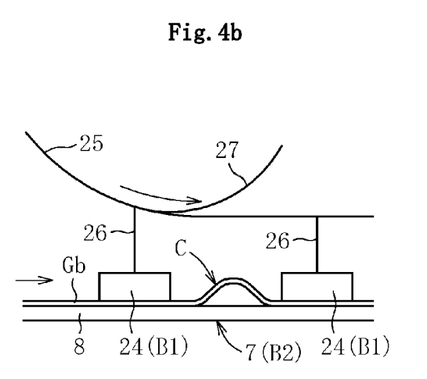
FIG. 4b An enlarged view of the main part of the vibration regulating means illustrated in FIG. 3.
Figure 5A:
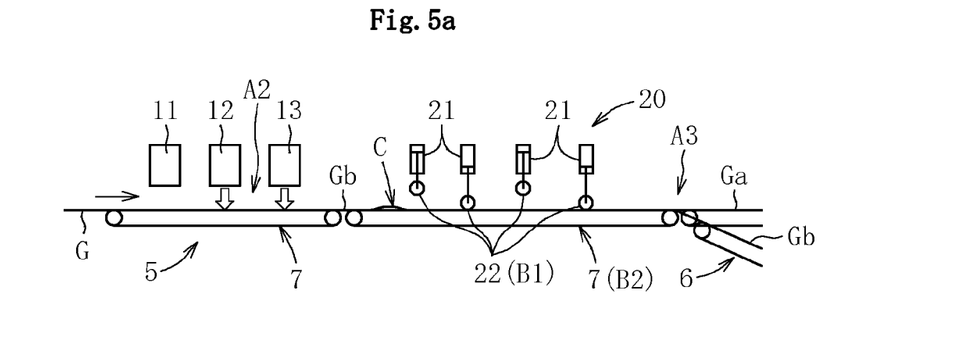
FIG. 5a A schematic side view illustrating still another example of the vibration regulating means in time series.
Figure 5B:
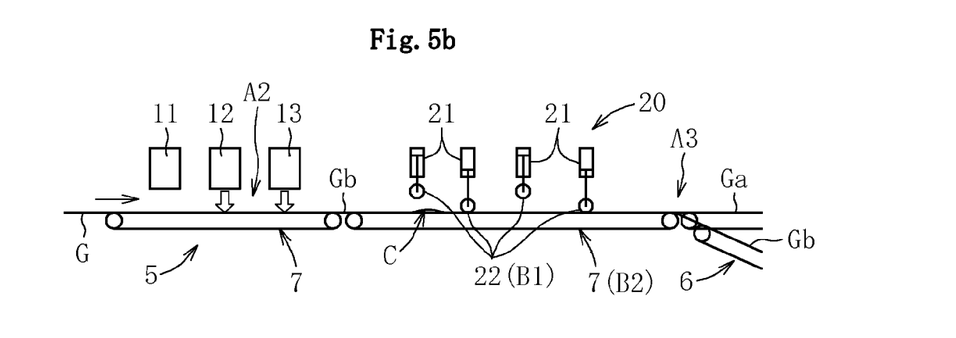
FIG. 5b A schematic side view illustrating the still another example of the vibration regulating means in time series.
Figure 5C:
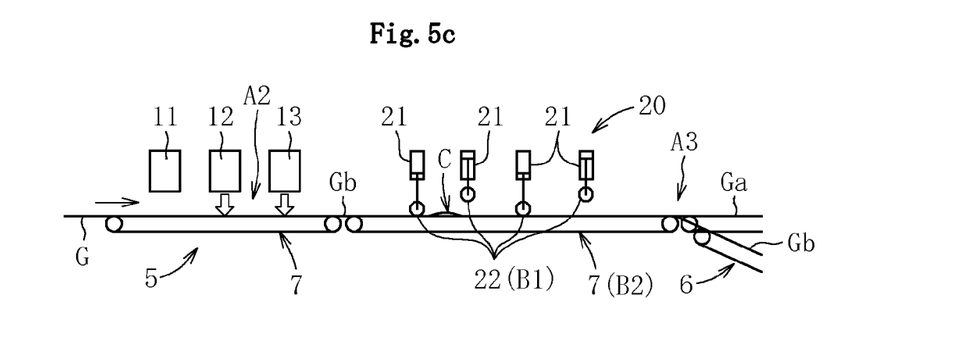
FIG. 5c A schematic side view illustrating the still another example of the vibration regulating means in time series.
Figure 5D:
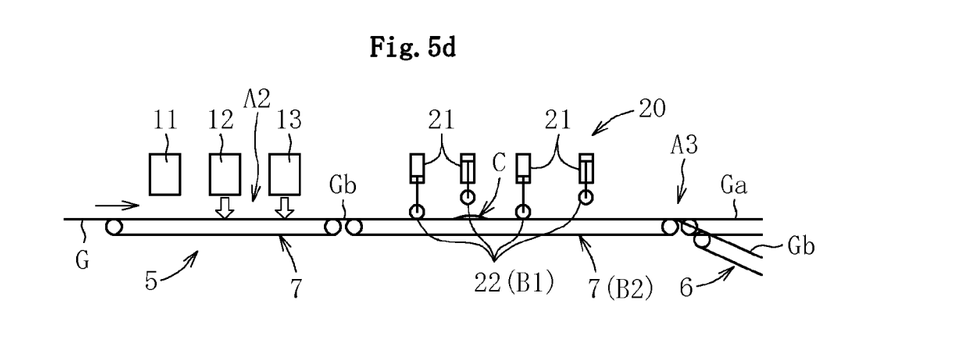
FIG. 5d A schematic side view illustrating the still another example of the vibration regulating means in time series.

By the way, in a case where the finishing step to be performed in the finishing area A4 is, for example, configured so that the product glass portion Ga is rolled into a roll shape to obtain a so-called glass roll, a predetermined tension is applied to the product glass portion Ga that is continuously delivered to the downstream side after the cleaving step is performed. On the other hand, no tension is applied to the unnecessary glass portion Gb that is continuously delivered to the downstream side after the cleaving step is performed. In addition, the longitudinal end portion of the unnecessary glass portion Gb is sequentially shattered (collected) in the collecting device 10, and hence the unnecessary glass portion Gb may be delivered to the downstream side without the smoothness corresponding to that of the product glass portion Ga. Therefore, the delivery speed differs between the product glass portion Ga and the unnecessary glass portion Gb, and the difference in delivery speed may cause a distortion C as illustrated in FIG. 4a in the longitudinal direction of the unnecessary glass portion Gb. When the distortion C is accidentally transmitted to the part of the glass film G that is present in the cleaving area A2, the cleaving accuracy of the glass film G is affected adversely. In contrast, when the structure of this embodiment is employed, the above-mentioned problem can be prevented to the extent possible. This is because, as illustrated in FIG. 4b, the distortion C can be absorbed between the two adjacent weights 24 and 24.

Note that, the method for absorbing the distortion C occurring in the longitudinal direction of the unnecessary glass portion Gb is not limited to the above-mentioned method.

For example, as illustrated in FIGS. 5a to 5d, the roller member 22 serving as the first member B1 for nipping the unnecessary glass portion Gb in cooperation with the conveyor 7 serving as the second member B2 is arranged in a plurality of (in the example of FIGS. 5a to 5d, four) separate locations in the longitudinal direction of the unnecessary glass portion Gb, and a timing at which each roller member 22 is pressed against the front surface of the unnecessary glass portion Gb is arbitrarily adjusted depending on the position of the distortion C that is present in the longitudinal direction of the unnecessary glass portion Gb. With this structure as well, it is possible to absorb the distortion C caused by the difference in delivery speed between the product glass portion Ga and the unnecessary glass portion Gb. Note that, even in the case where this structure is employed, in order to avoid the adverse effect on the cleaving accuracy of the glass film G due to the vibrations occurring along with the sequential shattering of the unnecessary glass portion Gb, at least one of the roller members (first member B1) and the conveyor 7 (second member B2) are configured to nip the unnecessary glass portion Gb therebetween.

In the above description, the so-called overflow downdraw method is employed as the method of forming the glass film G in the forming area A1, but the present invention is also applicable to a case of employing, as the method of forming the glass film G in the forming area A1, other methods such as a slot downdraw method and a float method, which are capable of forming the band-like glass film G from molten glass similarly to the overflow downdraw method. Further, the present invention is also suitably applicable to a case of employing, as the method of forming the glass film G in the forming area A1, a so-called redraw method, in which a solidified glass base material for fabrication is heated and drawn.

Further, in the above description, the present invention is applied to the manufacturing method for a glass film in which the collecting step of sequentially shattering and collecting the unnecessary glass portion Gb, which is continuously delivered in the longitudinal direction thereof, is executed after the execution of the cleaving step of dividing the glass film G, which is formed by the successive drawing from the forming device 2 (forming area A1), into the product glass portion Ga and the unnecessary glass portion Gb. In other words, the present invention is applied to the case where the forming of the glass film G, the successive cleaving of the glass film G, and the shattering/collecting processing for the unnecessary glass portion Gb are progressed at the same time. Alternatively, the present invention is also suitably applicable to a case where the step of forming the glass film G is not included.

Figure 6:
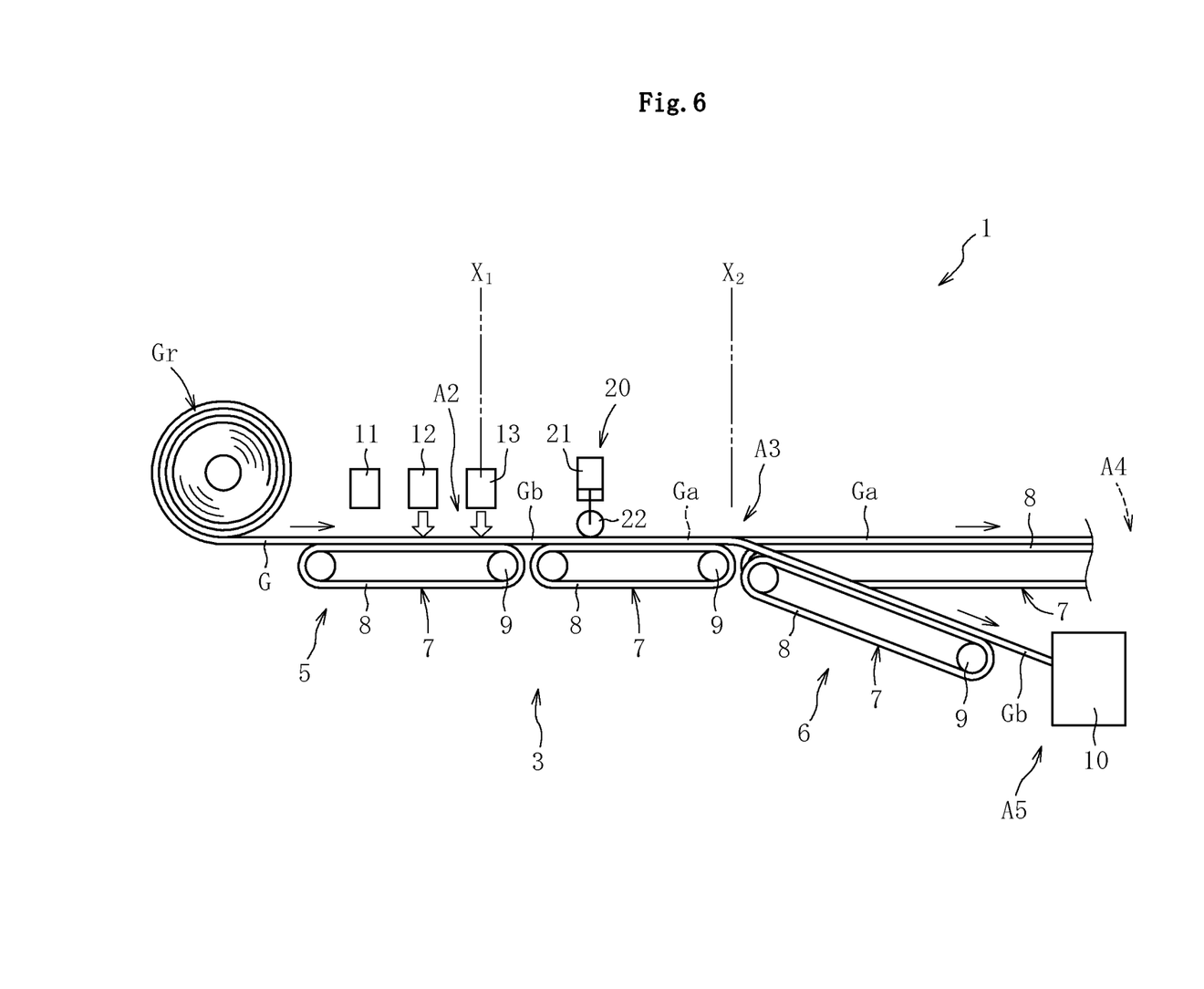
FIG. 6 A schematic side view illustrating another example of the manufacturing line to be used for implementing the manufacturing method for a glass film according to the present invention.

FIG. 6 is an illustration of a specific example of the above-mentioned case. FIG. 6 illustrates a case where the present invention is applied to the following manufacturing line 1 for a glass film. That is, the cleaving step of dividing the glass film G, which is unrolled from a so-called glass roll Gr and delivered in the longitudinal direction thereof, into the product glass portion Ga and the unnecessary glass portion Gb is executed, and then the collecting step of sequentially shattering and collecting the unnecessary glass portion Gb, which is continuously delivered in the longitudinal direction thereof (and the finishing step of finishing the product glass portion Ga, which is continuously delivered in the longitudinal direction thereof, into a predetermined glass product), are executed.

Note that, in FIG. 6, the vibration regulating means 20 illustrated in FIG. 1 (and FIG. 2) is employed, but as a matter of course, the vibration regulating means 20 as illustrated in FIG. 3 or FIG. 5 may be employed for the manufacturing line 1 for a glass film as illustrated in FIG. 6.

Further, in the above description, the present invention is applied to the case of executing, in the collecting step for the unnecessary glass portion Gb, the processing of shattering the band-like unnecessary glass portion Gb into minute glass pieces and collecting the glass pieces. Alternatively, the present invention is also suitably applicable to a case of executing, in the collecting step for the unnecessary glass portion Gb, processing of breaking the long, band-like unnecessary glass portion Gb into short glass sheets and collecting the glass sheets.

REFERENCE SIGNS LIST 1 manufacturing line for a glass film
2 forming device 3 conveyance device
4 curved conveyance section
5 horizontal conveyance section
6 inclined conveyance section
7 conveyor (second member)
10 collecting device
12 localized heating means
13 cooling means
20 vibration regulating means
22 roller member (first member)
24 weight (first member)
A1 forming area
A2 cleaving area
A3 separating area
A4 finishing area
A5 collecting area
B1 first member
B2 second member
G glass film
Ga product glass portion
Gb unnecessary glass portion

The invention claimed is:

1. A manufacturing method for a glass film, the manufacturing method comprising:

a cleaving step of separating a glass film having a band shape into a product glass portion and an unnecessary glass portion by successively cleaving, while delivering the glass film in a longitudinal direction thereof by a horizontal conveyance section extending in a horizontal direction, the glass film along a preset cleaving line extending in the longitudinal direction using a thermal stress that is generated along with localized heating performed along the preset cleaving line and cooling performed after the localized heating;

after the cleaving step, a collecting step of sequentially breaking or shattering the unnecessary glass portion, which is continuously delivered in the longitudinal direction, and collecting the broken or shattered unnecessary glass portion; and a vibration damping step of damping vibrations of the unnecessary glass portion in a thickness direction thereof after the unnecessary glass portion has been separated from the product glass portion in the cleaving step, by nipping the unnecessary glass portion by a first member contacting a front surface of the unnecessary glass portion and the horizontal conveyance section as a second member contacting a back surface of the unnecessary glass portion in at least one location in the longitudinal direction of the unnecessary glass portion, which is continuously delivered in the longitudinal direction by the horizontal conveyance section, the collecting step being executed on a downstream side of the at least one location of the vibration damping step such that the vibrations generated while the unnecessary glass portion is sequentially broken or shattered in the collecting step are prevented from being transmitted to the glass film present in a cleaving area where the cleaving step is executed, wherein the front surface of the unnecessary glass portion is uncontacted at the cleaving step.

2. The manufacturing method for a glass film according to claim 1, wherein the vibration damping step comprises damping the vibrations of the unnecessary glass portion in the thickness direction thereof in a plurality of separate locations in the longitudinal direction of the unnecessary glass portion.

3. The manufacturing method for a glass film according to claim 1, further comprising, after the cleaving step, a separating step of moving the product glass portion and the unnecessary glass portion away from each other by changing a delivery direction of at least one of the product glass portion and the unnecessary glass portion, wherein the cleaving step is followed by the vibration damping step, and the separating step is executed on a downstream side of the at least one location of the vibration damping step.

4. The manufacturing method for a glass film according to claim 1, wherein the first member comprises a draggably rotatable roller member.

5. The manufacturing method for a glass film according to claim 1, wherein the first member comprises a member movable in synchronization along the longitudinal direction with the unnecessary glass portion while changing a position in the longitudinal direction under a state in which the member is held in contact with the front surface of the unnecessary glass portion.

6. The manufacturing method for a glass film according to claim 1, wherein the collecting step comprises shattering the unnecessary glass portion into glass pieces and collecting the glass pieces, and the shattering includes introducing the unnecessary glass portion into a shattering passage through an introduction port located at one end side of the shattering passage and vibrating the unnecessary glass portion by an airflow formed inside the shattering passage to collide the unnecessary glass portion against an inner wall of the shattering passage.

7. The manufacturing method for a glass film according to claim 2, further comprising, after the cleaving step, a separating step of moving the product glass portion and the unnecessary glass portion away from each other by changing a delivery direction of at least one of the product glass portion and the unnecessary glass portion, wherein the cleaving step is followed by the vibration damping step, and the separating step is executed on a downstream side of the at least one location of the vibration damping step.

8. The manufacturing method for a glass film according to claim 1, wherein the first member has a central axis that is parallel to the front surface of the unnecessary glass portion.

9. The manufacturing method for a glass film according to claim 1, wherein the horizontal conveyance section is an endless belt member.

* * * * *